United States Patent [19]
Moser et al.

[11] Patent Number: 5,803,645
[45] Date of Patent: Sep. 8, 1998

[54] SPINDLE GUIDE

[75] Inventors: Gregory C. Moser; Jerry R. Smith, both of Columbus; William R. Horton, Jr., Hope, all of Ind.

[73] Assignee: Cosco, Inc., Columbus, Ind.

[21] Appl. No.: 740,442

[22] Filed: Oct. 30, 1996

[51] Int. Cl.⁶ .................................................. A47C 19/02
[52] U.S. Cl. ...................... 403/243; 403/252; 403/263; 403/361
[58] Field of Search .............................. 403/353, 22, 260, 403/259, 258, 257, 256, 247, 243, 252, 263, 361; 5/280, 309, 53.1, 282.1, 200.1

[56] References Cited

U.S. PATENT DOCUMENTS

| D. 36,606 | 10/1903 | Woodruff. | |
|---|---|---|---|
| 911,863 | 2/1909 | Adams. | |
| 960,340 | 6/1910 | Kimball. | |
| 998,582 | 7/1911 | Lucas. | |
| 1,070,814 | 8/1913 | Kimball. | |
| 1,114,486 | 10/1914 | Kimball. | |
| 1,352,594 | 9/1920 | Gail. | |
| 1,486,826 | 3/1924 | Atkinson. | |
| 3,058,777 | 10/1962 | Froedge. | |
| 3,338,600 | 8/1967 | Wahl | 403/361 X |
| 3,376,057 | 4/1968 | Van Buren, Jr. | 403/247 X |
| 4,050,831 | 9/1977 | DuBois | 403/243 |
| 4,270,872 | 6/1981 | Kiyosawa | 403/170 |
| 4,386,870 | 6/1983 | Baroody | 403/234 |
| 4,684,283 | 8/1987 | Lewis, Jr. | 403/361 X |
| 5,059,057 | 10/1991 | Graef | 403/298 |
| 5,134,732 | 8/1992 | Li | 5/282.1 X |
| 5,230,581 | 7/1993 | Deng | 403/260 |
| 5,426,797 | 6/1995 | Turner et al. | 5/93.1 |
| 5,517,744 | 5/1996 | Moser et al. | 29/525 |

FOREIGN PATENT DOCUMENTS

| 2357766 | 2/1978 | France | 403/361 |
|---|---|---|---|
| 2469985 | 6/1981 | France | 403/361 |

*Primary Examiner*—Anthony Knight
*Attorney, Agent, or Firm*—Barnes & Thornburg

[57] ABSTRACT

A connector assembly is provided that is adapted for use with a spindle. The connector assembly includes a bar formed to include an opening having a central axis and a bar-opening dimension and a connector adapted to receive the spindle. The connector includes a base positioned to lie upon the bar. The base includes a base opening and a retaining tab that extends outwardly from the base. The retaining tab includes an outer surface having a dimension less than the bar-opening dimension and an inclined surface converging from the base toward the central axis.

30 Claims, 2 Drawing Sheets

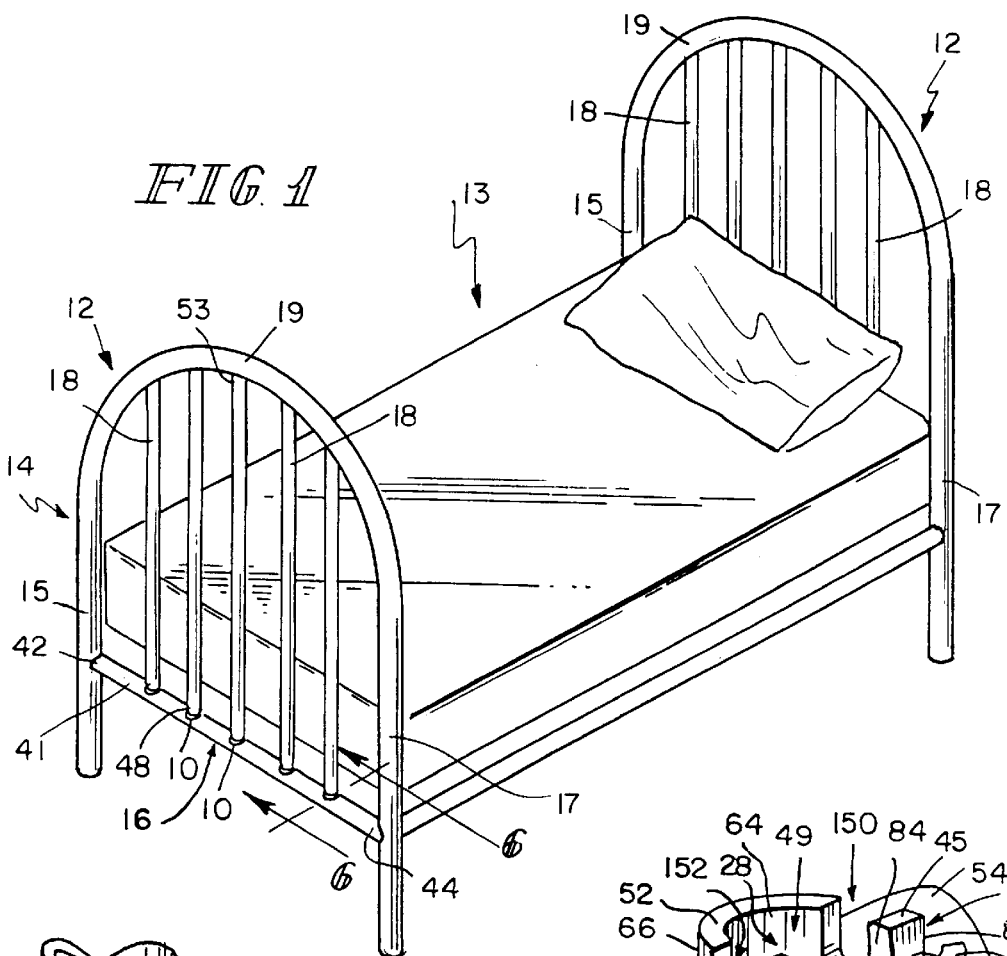
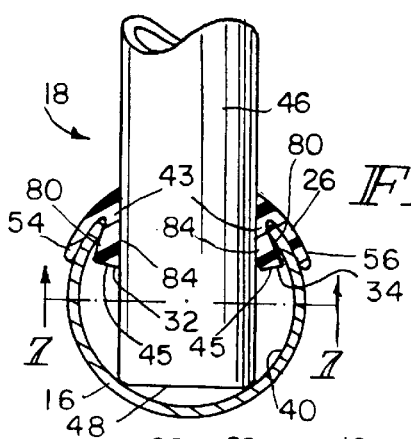
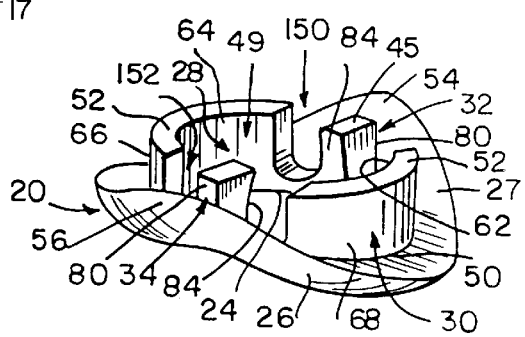
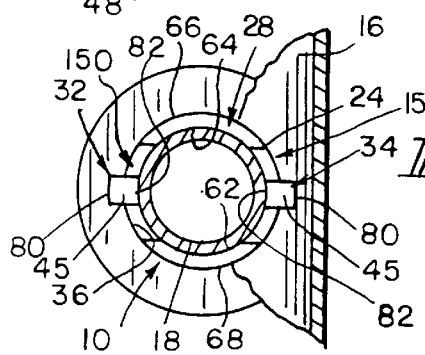
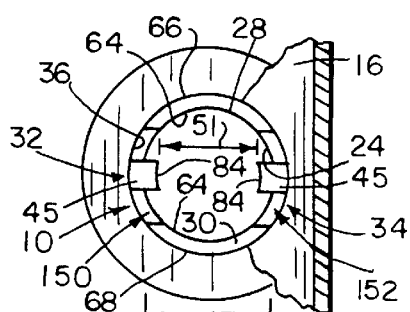

SPINDLE GUIDE

BACKGROUND AND SUMMARY OF THE INVENTION

The present invention relates to a guide for facilitating the insertion of a piece of tubing into an aperture formed in a bar, and particularly to a mechanical connector for use with furniture such as beds, cribs, and changing tables that have metal spindles mounted in a metal bar. More particularly, the present invention relates to a plastic spindle guide for positioning a metal spindle in an aperture of a metal support bar in a manner that covers the aperture and prevents the metal spindle from rattling against the metal bar.

Metal beds are disclosed in, for example, U.S. Pat. Nos. 911,863; 960,340; 1,070,814; and 1,352,594. Metal end frame assemblies for use with furniture such as beds, cribs, and changing tables are also known. See, for example, U.S. Pat. Nos. 5,426,797 and 998,582. These end frames provide structural support to the item to which the end frame is attached. In addition, the aesthetic qualities of beds, cribs, and changing tables can be enhanced by forming components of the end frames into decorative shapes and/or painting these components.

Metal components of conventional end frame assemblies are often connected together by the insertion of one component into a dye-punch hole of the corresponding component. Often times, it is difficult and even impractical to dye-punch the receiving hole to the exact dimension of the corresponding component. Thus, the components are often connected together by welding to fill the gaping aperture and to prevent undesirable changing or rattling between the components.

Multi-colored painting of welded end frame assemblies is often, however, difficult and expensive. Painting individual components of an end frame assembly different colors after they have been welded together is also expensive and time consuming because end frame assembly components of one color must be masked before other components are painted a different color. The masking must then be removed, adding additional time and expense to the painting process. The failure to remove masking and adhesive from a component destroys the aesthetic value of the component. Thus, the end frame assembly containing the masking must either be disposed of or disassembled with the masked component or components removed and subsequently reassembled and painted.

In addition to painting difficulties, metal components of conventional frames that are not securely fastened together or that become loose can create an undesirable rattling or clanging sound. In addition, the aesthetic appearance of spindles extending into a support bar can be negatively impacted by a sloppy welding job or by a gaping aperture surrounding the spindle. What is needed is a spindle guide that positions a pre-painted metal component of an end frame assembly into an aperture of a corresponding metal component while substantially covering the aperture and preventing metal-on-metal rattling.

In accordance with the present invention, a connector is provided for use with a spindle and a bar having an outer surface and an aperture formed through the outer surface. The connector includes a base that is formed to rest on the bar adjacent the aperture in a predetermined attachment position and a retaining tab that extends outwardly from the base. The base itself includes a rim that defines a hole that is sized to receive the spindle therein. In addition, the retaining tab of the connector is sized to extend through the aperture in the bar in the pre-determined attachment position and is formed to securely engage the bar upon insertion of the spindle into the hole of the base.

In another embodiment of the present invention, an end frame assembly is provided that includes an outer frame with downwardly extending legs, a bar that interconnects the legs and that includes a center portion with aperture therein, a spindle, and a spindle guide. The spindle guide has a base that includes a hole for receiving the spindle and a flexible tab mechanism that extends into the aperture of the bar and that is yieldably biased by the spindle into engagement with the bar. The cooperation of the spindle and the tab mechanism causes the base to be securely mounted on the bar.

In yet another embodiment of the present invention a method of connecting a spindle to a bar that has an outer wall, an inner wall, and a rim that defines an aperture extending between the outer and inner wall. The method includes positioning a spindle guide that has a base formed to include a hole therethrough and a retaining tab that extends outwardly from the base on the bar so that the base rests on the outer wall and the retaining tab extends through the aperture. The spindle is then inserted through the hole in the base until the spindle yieldably presses the retaining tab into a wedged engagement with the rim to retain the spindle guide in the aperture formed in the bar.

The spindle guide in accordance with the present invention is preferably formed as a one-piece plastic unit and is configured for secure engagement with the bar without the need of additional fasteners and inserts. Since the spindle guide is a one-piece unit, it is quickly installed onto the end frame assembly thus reducing assembly time and enabling increased production of end frame assemblies. Moreover, once the end frame assembly has been constructed, the spindle guide is substantially blocked from rotating on the bar and from rising upon the spindle during use.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a bed having a pair of opposite end frame assemblies in accordance with the present invention, each end frame assembly having a U-shaped outer frame, a bar, a plurality of spindles attached between the outer frame and the bar, and a plurality of spindle guides for securing each spindle to the bar;

FIG. 3 is an inverted perspective view of the spindle guide of FIG. 2 showing the spindle guide including a pair of guide tabs and a pair of retaining tabs positioned between the pair of guide tabs and showing the retaining tabs having inwardly extending angled surfaces for engagement with the spindle;

FIG. 5 is a sectional view taken along line 5—5 of FIG. 4 showing the inwardly extending retaining tabs unactuated with respect to both the spindle and the bar;

FIG. 6 is a view taken along line 6—6 of FIG. 1 showing the pressing the retaining tabs radially outwardly for a secure wedged engagement with the bar; and FIG. 7 is a sectional view taken along line 7—7 of FIG. 6 showing the retaining tabs being pressed radially outwardly by the spindle to interface with the bar to prevent the spindle guide from dislodging from the bar when the end frame is fully assembled.

DETAILED DESCRIPTION OF THE DRAWINGS

Figure 2:
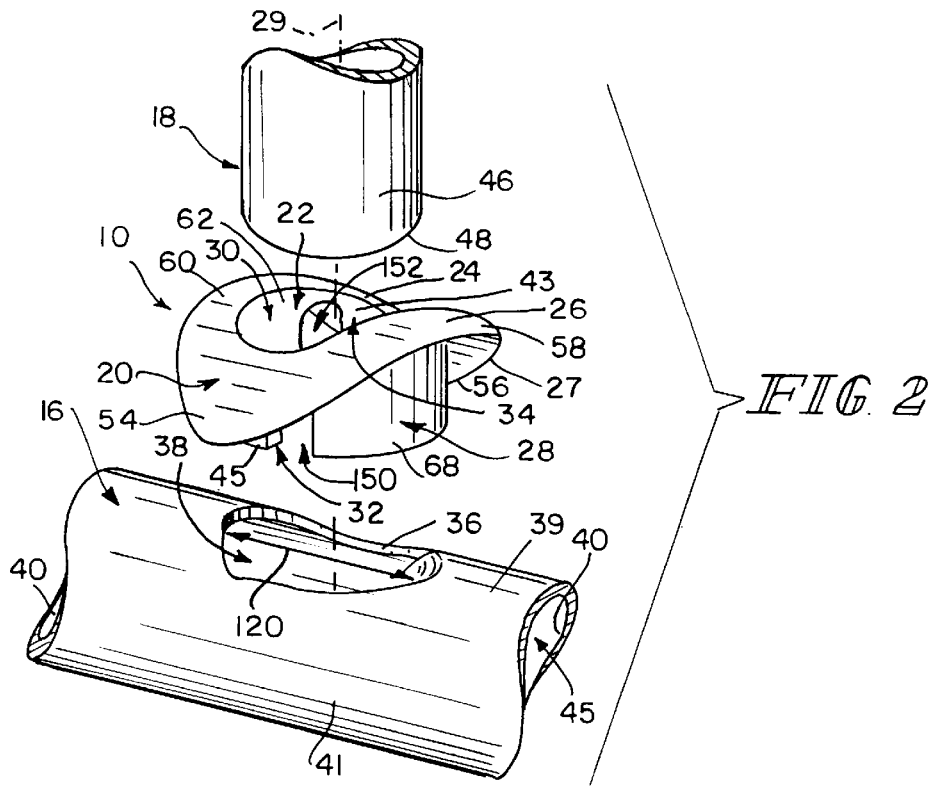
FIG. 2 is an enlarged exploded perspective of a portion of one end frame assembly of FIG. 1 showing the spindle, the bar including an aperture for receiving the spindle guide, and the spindle guide including a base having a hole for receiving the spindle and a plurality of tabs connected to the base for securing the spindle to the bar.

A plurality of spindle guides 10 in accordance with the present invention are shown in FIG. 1 as they would appear to a user after the guides 10 have been installed in an end frame assembly 12 for a bed 13. The end frame assembly 12 has a U-shaped outer frame 14 with a curved top portion 19 and opposing legs 15, 17, a substantially cylindrical support bar 16 extending between the legs 15, 17, and a plurality of spindles 18. The spindles 18 interact with the spindle guides 10 to hold the guides 10 on the bar 16 without the need for welding or a multi-part connection apparatus including nuts, bolts, or the like. Although an end frame assembly 12 for the bed 13 is illustrated, it is understood that spindle guide 10 could be used to attach spindles 18 to virtually any rod, tube or other elongated component.

Figure 4:
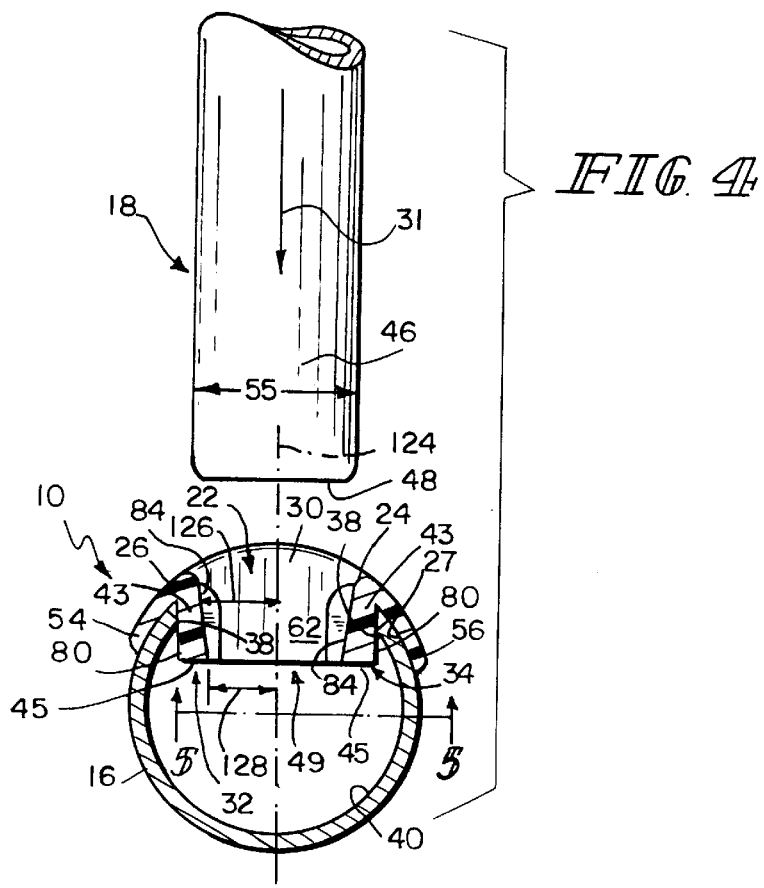
FIG. 4 is an exploded sectional view of the end frame assembly of FIG. 2 after the spindle guide has been inserted in the aperture of the bar and showing the retaining tabs of the spindle guide extending through the aperture and the spindle being sized for insertion into the hole of the spindle guide.

Each spindle guide 10, one of which is shown in FIGS. 2–7, is formed from a resilient plastic material and includes a base 20 and tabs 28, 30, 32, 34 extending outwardly from the base 20. Referring now to FIG. 2, the base 20 is saddle-shaped and includes an outer face 26, an opposite inner face 27 that is formed to nest automatically in a predetermined attachment position on the bar 16, and a guide rim 24 that defines a hole 22 between the outer and inner faces 26, 27. The faces 26, 27 cooperate to form a pair of raised portions 54, 56 positioned in spaced-apart relation to one another and a pair of valley portions 58, 60 positioned between raised portions 54, 56. The raised portions 54, 56 and valley portions 58, 60 are shaped to mimic the cylindrical shape of bar 16. Thus, the spindle guide 10 can be positioned flush against bar 16 and provide a substantially smooth surface as shown in FIGS. 1, 4 and 6.

Referring now to FIG. 3, guide tabs 28, 30 and retaining tabs 32, 34 are mounted on the inner face 27 of the base 20 about the circumference of the guide rim 24. The guide tabs 28, 30 and retaining tabs 32, 34 cooperate with the rim 24 to define a tube-like opening 49 for receiving the spindle 18 therein. The guide tabs 28, 30 of each spindle guide 10 cooperate with one another to guide the insertion of the spindle 18 through hole 22 along a vertical axis 29, as shown in FIG. 2. First and second guide tabs 28, 30 define a first space 150 and a second space 152 therebetween. Second space 152 is positioned to lie opposite first space 150 as shown in FIG. 3. The retaining tabs 32, 34 cooperate to hold the inner face 27 of the spindle guide 10 on the bar 16.

The retaining tabs 32, 34 are flexible and include a first end 43 mounted on the base 20 and an opposite free end 45. As shown in FIG. 3, the retaining tabs 32, 34 are preferably positioned to lie within first and second spaces 150, 152 respectively on opposite sides of the rim 24 between the guide tabs 28, 30. In a normal unattached position, as shown in FIGS. 4 and 5 the first ends 43 of the tabs 32, 34 cooperate to form a first dimension 47 therebetween (See FIG. 5) and the free ends 45 of the tabs 32, 34 form a second dimension 51 therebetween that is less than the first dimension. In the attachment position shown in FIG. 4, first end 43 and central axis 124 cooperate to define a second radial dimension 126 and free end 45 and central axis 124 cooperate to define a third radial dimension 128. As best shown in FIG. 3, the retaining tabs 32, 34 are generally triangular shaped and include a straight post surface 80 and an angled surface 84. The angled surface 84 of each tab 32, 34 extends into the tube-like opening 49 to form the second dimension 51. While a pair of retaining tabs 32, 34 are illustrated, it is understood, that greater or fewer than two retaining tabs 32, 34 having a variety of shapes may be positioned on the base 20 so long as the free end 45 of at least one tab defines a second dimension 51 that is less than the diameter 55 of the spindle 18.

Referring to FIG. 3, guide tabs 28, 30 include a mounted end 50 and an opposite end 52 spaced-apart from the base 20. The guide tabs 28, 30 further include respective concave inner surfaces 64, 62 for guiding the spindle 18 through the hole 22 and convex outer surfaces 66, 68. Preferably, guide tabs 28, 30 each extend approximately one-fourth of circumference of the rim 24 of hole 22 and are located on opposite sides of the rim 24 such that the concave inner surface 62 of guide tab 30 faces the concave inner surface 64 of guide tab 28. It is understood, however, that while a pair of guide tabs 28, 30 are shown, greater or fewer than two guide tabs 28, 30, having a variety of widths and shapes may be positioned about the circumference of the rim 24 so long as the tabs 28, 30 correspond with the spindle 18.

The spindle guide 10 as it would appear just prior to insertion into the bar 16 is shown in FIG. 2. The bar 16 is preferably constructed of metal and includes a center portion 41 and opposite end portions 42, 44. The center portion 41 of the bar 16 also includes a cylindrical outer wall 39 and an inner wall 40 that defines an inner region 45. Further, the center portion 41 of the bar 16 has support rims 36 formed thereon that each define an aperture 38 configured to receive the tabs 28, 30, 32, 34 of the spindle guide 10 as shown in FIGS. 4 and 6. The rims 36 are positioned through the center portion 41 in spaced-apart relation to one another. Each rim 36 has a dimension 120 and includes a central axis 124 extending therethrough. Central axis 124 and rim 36 cooperate to define a radial dimension therebeetween. Center portion 41 of bar 16 is generally linear in shape, but may take a variety of forms so long as each spindle guide 10 is securely attached thereto. In addition it is understood that the diameter of the apertures 38 in bar 16 may take on a variety of shapes and sizes so long as the aperture is sized to receive the tabs 2, 30, 32, 34 therein.

Spindle guide 10 is connected to the spindle 18 as shown in FIGS. 6 and 7. Preferably, the spindle 18 is constructed of metal and includes a cylindrical outer surface 46 and has opposite ends 48, 53. It is, however, within the scope of this invention that spindle 18 could be any rod, tube, or other generally elongated member used in the construction of furniture so long as it is sized for insertion into the hole 22 and has a diameter as shown by arrow 55 that is greater than the second dimension 51 of the retaining tabs 32, 34.

To mount the spindle 18 on the bar 16, the tabs 28, 30, 32, 34 of the spindle guide 10 are first inserted through the aperture 38 in the bar 16. The spindle guide 10 is adjusted in the aperture 38 of bar 16 until the inner face 27 of the base 20 rests flushly against the cylindrical outer wall 39 of bar 16. In this position, the angled surface 84 of the retaining tabs 32, 34 flange radially inwardly as shown in FIGS. 4 and 5 to provide a narrowing tube-like passageway 49 for receiving the spindle 18. In preferred embodiments, the post surfaces 80 of the tabs 32, 34 do not securely engage the rim 36 when resting on the bar 16 without the spindle 18 so that the spindle connector 10 may be easily removed or adjusted.

Sliding axially inward movement as shown by arrow 31, of the spindle 18 through the hole 22 of the spindle guide 10, however, forces the retaining tabs 32, 34 to yieldably flex in a radially outward direction relative to the vertical axis 29. At this time the retaining tabs 32, 34 are effectively wedged against the rim 36 of the bar 16. The spindle guide 10 is thus said to be in a bar fastened position as shown for example in FIGS. 6 and 7. When the spindle 18 is fully inserted into the inner region 45 of bar 16, the bottom edge 48 of spindle 18 preferably rests against the inner wall 40.

When the spindle guide 10 is in the bar fastened position, the base 20 extends across a portion of the aperture 38 in the bar 16 to form an cosmetic cover and the rim 24 of the spindle guide 10 engages the outer surface 46 of the spindle 18. Illustratively, the concave inner surfaces 62, 64 of guide tabs 28, 30 and the angled surfaces 84 of the retaining tabs 32, 34 fictionally engage the spindle 18. Thus, the spindle guide 10 of the present invention effectively insulates the metal spindle 18 from the metal bar 16 and thus prevents undesirable metal-on-metal clanging between the bar 16 and spindle 18.

In addition, as best shown in FIG. 6, the raised portions 54, 56 of the base 20 that rest on surface 39 in conjunction with the wedged engagement of the tabs 32, 34 with the rim 36 substantially block rotation of the spindle guide 10 on the bar 16. The tabs 32, 34 of the spindle guide 10 further cooperate with the spindle 18 to secure the base 20 of the guide 10 on the outer surface 39 of the bar 16 so that the guide 10 doesn't ride-up on the spindle 18 during use.

Although the invention has been described in detail with reference to a preferred embodiment. Varieties and modifications exist within the scope and spirit of the invention as described and defined in the following claims.

What is claimed is:

1. A spindle-tube connector comprising
   a base formed to include a circular rim defining an aperture adapted to receive a spindle therein, first and second guide tabs appended to an inner face of the base at the circular rim and positioned to lie in circumferentially spaced apart and confronting relation to one another on opposite sides of the circular rim,
   a first flexible retaining tab including a first end and an opposite free end, the first end being appended to the inner face of the base at the circular rim in a first space between the first and second guide tabs, and
   a second flexible retaining tab including a first end appended to the inner face of the base at the circular rim in a second space between the first and second guide tabs.

2. The spindle-tube connector of claim 1, wherein the first ends of the first and second flexible retaining tabs form a first dimension therebetween and the opposite ends of the first and second flexible retaining tabs form a second dimension therebetween, and the second dimension is less than the first dimension.

3. The spindle-tube connector of claim 2, wherein the rim has a diameter substantially equivalent to the first dimension.

4. The spindle-tube connector of claim 1, wherein each of the first and second guide tabs is curved to extend along the circular rim and includes a concave surface facing toward the aperture defined by the rim.

5. The spindle-tube connector of claim 4, wherein each of the first and second flexible tabs is generally triangle shaped and includes a straight post surface facing away from the aperture and an angled surface facing toward the aperture.

6. The spindle-tube connector of claim 1, wherein each of the first and second flexible retaining tabs is generally triangle shaped and includes a straight post surface facing away from the aperture and an angled surface facing toward the aperture.

7. The spindle-tube connector of claim 1, wherein the base is saddle shaped and includes a valley portion adjacent to each of the first and second guide tabs, a first raised portion in radially spaced-apart relation to the free end of the second flexible retaining tab, and the first and second raised portions of the base are positioned to lie in spaced-apart relation one to another to position the first and second flexible retaining tabs therebetween.

8. The spindle-tube connector of claim 7, wherein the first flexible retaining tab is generally triangle shaped and includes a straight post surface facing toward the first raised portion of the base and an angled surface facing toward the aperture and the second raised portion of the base.

9. The spindle-tube connector of claim 8, wherein the second flexible retaining tab is generally triangle shaped and includes a straight post surface facing toward the second raised portion of the base and an angled surface facing toward the aperture and the second raised portion of the base.

10. The spindle-tube connector of claim 7, wherein each of the first and second guide tabs is curved to extend along the circular rim and includes a concave surface facing toward the aperture defined by the rim.

11. The spindle-tube connector of claim 1, wherein the inner face of the base is saddle-shaped and adapted to mate with a cylindrical tube formed to include an opening receiving the first and second guide tabs and the first and second flexible retaining tabs.

12. A spindle-tube assembly comprising
    a bar formed to include a center portion having an opening formed therein with a central axis therethrough, the opening having a bar-opening dimension,
    a spindle, and
    a base formed to include a circular rim defining an aperture adapted to receive the spindle therein, first and second guide tabs appended to an inner face of the base at the circular rim and positioned to lie in circumferentially spaced apart and confronting relationship to one another on opposite sides of the circular rim, a first flexible retaining tab including an upper end appended to the inner face of the base at the circular rim in a first space between the first and second guide tabs and an opposite lower end, and a second flexible retaining tab including a first end appended to the inner face of the base at the circular rim in a second space between the first and second guide tabs, the first and second guide tabs and first and second flexible retaining tabs extending into the opening formed in the bar and the first and second flexible retaining tabs being yieldably biased by the spindle away from the central axis into engagement with the bar, such that the inner surface of the base is mounted on the center portion.

13. The spindle-tube assembly of claim 12, wherein the base includes an outer face opposite the inner face and the inner face is formed for engagement with the center portion of the bar adjacent the opening.

14. The spindle-tube assembly of claim 13, wherein the inner face of the base is formed to cover part of the opening in the bar.

15. The spindle-tube assembly of claim 14, wherein the rim of the base is formed to have a diameter that is substantially equivalent to the spindle.

16. The spindle-tube assembly of claim 12, wherein each of the first and second guide tabs is curved to extend along the circular rim and includes a concave surface facing toward the aperture defined by the inner edge.

17. The spindle-tube assembly of claim 16, wherein each of the first and second flexible retaining tabs is generally triangle shaped and includes a straight post surface facing away from the aperture and an angled surface facing toward the aperture.

18. The spindle-tube assembly of claim 12, wherein the base is saddle shaped and includes a lowered portion adjacent to each of the first and second guide tabs, a first raised portion in radially spaced-apart relation to the lower end of the first flexible retaining tab, and a second raised portion in radially spaced-apart relation to the lower end of the second flexible retaining tab, and the first and second raised portions of the base are positioned to lie in spaced-apart relationship to one another to position the first and second flexible retaining tabs therebetween.

19. The spindle-tube assembly of claim 18, wherein the first and second flexible tabs are generally triangle shaped and each retaining tab includes a straight post surface and an angled surface facing toward the aperture.

20. The spindle-tube assembly of claim 18, wherein each of the first and second guide tabs is curved to extend along the circular edge and includes a concave surface facing toward the aperture defined by the inner rim.

21. A spindle-tube assembly adapted for use with a spindle, the spindle-tube assembly comprising
 a bar formed to include an opening having a central axis therethrough, the aperture having a bar-opening dimension,
 a connector adapted to receive the spindle, the connector including a base positioned to lie upon the bar in a normal position and formed to include a circular edge defining an aperture adapted to receive a spindle therein, first and second guide tabs appended to an inner side of the base at a circular edge and positioned to lie in circumferentially spaced apart and confronting relation to one another on opposite sides of the circular edge, a first flexible retaining tab including a first end appended to the inner side of the base at the circular edge in a first space between the first and second guide tabs, an opposite lower end, and a middle surface extending between the first end and the opposite lower end of the first retaining tab, and a second flexible retaining tab including a first end appended to the inner side of the base at the circular edge in a second space between the first and second guide tabs, an opposite lower end, and a middle surface extending between the first end and opposite lower end of the second retaining tab, the first ends of the first and second flexible retaining tabs having dimensions less than the bar-opening dimension and the middle surfaces of the first and second flexible retaining tabs converging from the base toward the central axis when the base is in the normal position.

22. The spindle-tube assembly of claim 21, wherein each of the first and second guide tabs is curved to extend along the circular edge and include a concave surface facing toward the aperture defined by the circular edge.

23. The spindle-tube assembly of claim 22, wherein each of the first and second flexible retaining tabs is generally triangle shaped and includes a straight post surface facing away from the aperture and an angled surface facing toward the aperture.

24. The spindle-tube assembly of claim 21, wherein each of the first and second flexible retaining tabs is generally triangle shaped and includes a straight post surface facing away from the aperture and an angled surface facing toward the aperture.

25. The spindle-tube assembly of claim 21, wherein the base is saddle shaped and includes a valley portion adjacent to each of the first and second guide tabs, a first raised portion in radially spaced-apart relation to the lower end of the first flexible retaining tab, and a second raised portion in a radially spaced-apart relation to the lower end of the second flexible retaining tab, and the first and second raised portions of the base are positioned to lie in spaced-apart relation to one another to position the first and second flexible retaining tabs therebetween.

26. The spindle-tube assembly of claim 25, wherein the first and second flexible retaining tabs are generally triangle shaped and include a straight post surface and an opposite angled surface toward the central axis.

27. The spindle-tube assembly of claim 25, wherein each of the first and second guide tabs is curved to extend along the circular edge and includes a concave surface facing toward the aperture defined by the inner edge.

28. A connector assembly adapted for use with a spindle, the assembly comprising
 a bar formed to include an opening having a central axis therethrough, the opening having a bar-opening dimension,
 a connector adapted to receive the spindle, the connector including a base positioned to lie upon the bar in a normal unattached position and formed to include a base opening therethrough that is adapted to receive a spindle and a pair of retaining tabs extending outwardly from the base, the retaining tabs each including a first end adjacent the base, an opposite free end, an outer surface having a dimension less than the bar-opening dimension, and an inclined surface converging from the base toward the central axis when the base is in the normal unattached position, and
 a pair of guide tabs positioned to lie in spaced-apart relation between the pair of retaining tabs.

29. The connector assembly of claim 28, wherein the retaining tabs are flexible.

30. A connector assembly adapted for use with a spindle, the assembly comprising
 a bar formed to include a rim defining an opening having a central axis therethrough, the rim and the central axis cooperating to define a first radial dimension,
 a connector adapted to receive the spindle, the connector including a base positioned to lie upon the bar and formed to include a base opening therethrough to receive the spindle and a pair of retaining tabs extending outwardly from the base. the retaining tabs being flexible and each including an upper end adjacent the base and an opposite lower end, wherein the upper end and the central axis define a second radial dimension therebetween and the lower end and the central axis define a third radial dimension therebetween and the second radial dimension is less than the first radial dimension and greater than the third radial dimension, and
 a pair of guide tabs positioned to lie in spaced-apart relation between the pair of retaining tabs.

* * * * *